US012736319B2

(12) United States Patent
Lee et al.

(10) Patent No.: US 12,736,319 B2
(45) Date of Patent: Sep. 15, 2026

(54) APPARATUS AND METHOD FOR MANAGING BLASTING DESIGN ON BASIS OF GNSS

(71) Applicant: HANWHA CORPORATION, Seoul (KR)

(72) Inventors: Dong Hee Lee, Seongnam-si (KR); Seung Won Seo, Seongnam-si (KR); Jong Yeop Kim, Seongnam-si (KR)

(73) Assignee: HANWHA CORPORATION, Seoul (KR)

( * ) Notice: Subject to any disclaimer, the term of this patent is extended or adjusted under 35 U.S.C. 154(b) by 203 days.

(21) Appl. No.: 18/915,815

(22) Filed: Oct. 15, 2024

(65) Prior Publication Data

US 2025/0123088 A1 Apr. 17, 2025

(30) Foreign Application Priority Data

Oct. 16, 2023 (KR) ........................ 10-2023-0137583

(51) Int. Cl.
*F42D 3/04* (2006.01)
*G01S 19/07* (2010.01)
*G01S 19/14* (2010.01)

(52) U.S. Cl.
CPC .............. *F42D 3/04* (2013.01); *G01S 19/071* (2019.08); *G01S 19/14* (2013.01)

(58) Field of Classification Search
CPC ........... F42D 3/04; G01S 19/071; G01S 19/14
USPC .......................................................... 102/311
See application file for complete search history.

(56) References Cited

U.S. PATENT DOCUMENTS 11,650,595 B2 * 5/2023 Subramanian .......... E02F 9/205 701/23
2007/0150149 A1 * 6/2007 Peterson ................ E02F 3/437 701/50
2009/0076674 A1 * 3/2009 Kiegerl ..................... E02F 1/00 701/2

(Continued)

FOREIGN PATENT DOCUMENTS

JP 2003-253661 A 9/2003
JP 2022-525581 A 5/2022
KR 10-2022-0153300 A1 11/2022

(Continued)

*Primary Examiner* — Samir Abdosh
(74) *Attorney, Agent, or Firm* — Bridgeway IP Law Group, PLLC; Jihun Kim

(57) ABSTRACT

Proposed is an apparatus and method for managing a blasting design on the basis of the Global Navigation Satellite System (GNSS). The apparatus includes a position information data receiving unit configured to receive current position information data of a terminal attached to a drilling apparatus and position correction data of the terminal by receiving each GNSS position signal from a plurality of GNSS satellites, a precision position data acquisition unit configured to acquire precision position data of the terminal, a guideline display unit configured to display burden and interval guidelines that are derived on the basis of the precision position data acquired on a screen of the terminal and an input blasting pattern, and a blast hole position information storage unit configured to store blast hole position information input by a drilling worker through the terminal on the basis of the displayed guidelines.

11 Claims, 3 Drawing Sheets

(56) References Cited

U.S. PATENT DOCUMENTS

2012/0271504 A1* 10/2012 Reiners ................. E02F 9/2054
701/439
2014/0032061 A1* 1/2014 Wulf ..................... E02F 9/2025
701/51

FOREIGN PATENT DOCUMENTS

KR 10-2022-0153338 A 11/2022
WO WO-2025206888 A1 * 10/2025 ............... F42D 3/04

* cited by examiner

APPARATUS AND METHOD FOR MANAGING BLASTING DESIGN ON BASIS OF GNSS

CROSS REFERENCE TO RELATED APPLICATION

The present application claims priority to Korean Patent Application No. 10-2023-0137583, filed Oct. 16, 2023, the entire contents of which are incorporated herein for all purposes by this reference.

BACKGROUND OF THE INVENTION

Field of the Invention

The present disclosure relates to an apparatus and method for managing a blasting design on the basis of the Global Navigation Satellite System (GNSS). More particularly, the present disclosure relates to an apparatus and method for managing a blasting design on the basis of a GNSS, the apparatus and method being configured to display burden and interval guidelines that are derived on the basis of precision position data acquired on a screen of a terminal and an input blasting pattern when blasting information, the blasting pattern, and a position where drilling will be performed next are input into a blasting design program of the terminal by a drilling worker who has detached the terminal from a drilling apparatus, and the apparatus and method being configured to generate the blasting design on the basis of blast hole position information that is input by the drilling worker through the terminal on the basis of the displayed guidelines.

Description of the Related Art

Generally, a blasting system for exploding and demolishing an object by using an explosive has been used in the construction field such as blasting of bedrock, blasting of abandoned buildings, and outdoor blasting.

Specifically, a region or object to be blasted is divided into a plurality of sections, and a plurality of blasting holes into which explosives are inserted are formed for each section. The explosives are loaded into the drilled blasting holes, respectively, and then are connected to a blasting device. When detonators positioned in the blasting holes are detonated, the explosives are detonated and the object to be blasted is exploded and collapsed.

In regard to operations of the above blasting system, in the related art, each process has been performed by a human directly or by a human-manipulated machine. However, there is a possibility that an error may be caused by the human in the conventional blasting system. In addition, due to the error, the blasting result of the blasting system may not satisfy the required conditions (such as blasting degree, scale, crushing degree, vibration, noise, and so on).

In addition, in a conventional blasting design system, a blasting design is performed on an imaginary plane. However, since the blast design system in which the blast design is performed on the imaginary plane does not reflect three-dimensional actual topographical information, there was a problem that the reliability of the result prediction was significantly reduced.

In addition, there may be a difference between the blasting design and the actual work result in the work of drilling, charging, and so on, and the difference is large. Since the conventional blasting design system predicts the blasting result on the premise that each work is accurately performed according to the blasting design, there was a problem that the actual blasting result could not be reflected.

In this regard, in Korean Patent No. 10-2022-0153338, there is provided a "BLASTING MANAGEMENT SYSTEM FOR ANALYSIS OF VIBRATION AND FRAGMENTATION CAUSED BY BLASTING".

SUMMARY OF THE INVENTION

Accordingly, the present disclosure has been made keeping in mind the above problems occurring in the related art, and an objective of the present disclosure is to provide an apparatus and method for managing a blasting design on the basis of the Global Navigation Satellite System (GNSS), the apparatus and method being configured to acquire precision position data of a terminal attached to a drilling apparatus by applying current position information data of the terminal attached to the drilling apparatus and position correction data of the terminal by receiving each GNSS position signal from a plurality of GNSS satellites, the position correction data being repeatedly generated by a plurality of reference stations for each GPS satellite.

In addition, another objective of the present disclosure is to provide an apparatus and method for managing a blasting design on the basis of a GNSS, the apparatus and method being configured to display burden and interval guidelines that are derived on the basis of precision position data acquired on a screen of a terminal and an input blasting pattern when blasting information, the blasting pattern, and a position where drilling will be performed next are input into a blasting design program of the terminal by a drilling worker who has detached the terminal from a drilling apparatus.

In addition, still another objective of the present disclosure is to provide an apparatus and method for managing a blasting design on the basis of a GNSS, the apparatus and method being configured to store blast hole position information input by a drilling worker through a terminal on the basis of displayed guidelines and being configured to generate the blasting design on the basis of the stored blast hole position information.

In addition, yet another objective of the present disclosure is to provide an apparatus and method for managing a blasting design on the basis of GNSS, the apparatus and method being configured to instruct a drilling worker to re-attach a terminal to a drilling apparatus and then to perform drilling work using the drilling apparatus by providing the blasting design generated on the basis of stored blast hole position information on a screen of the terminal, and the apparatus and method being configured to instruct a charging worker to perform charging work by sending the generated blasting design to a terminal of the charging worker when the drilling worker inputs a drilling work completion message through the terminal of the drilling worker.

In order to achieve the objectives described above, according to the present disclosure, there is provided an apparatus for managing a blasting design on the basis of the Global Navigation Satellite System (GNSS), the apparatus including: a position information data receiving unit configured to receive current position information data of a terminal attached to a drilling apparatus and position correction data of the terminal by receiving each GNSS position signal from a plurality of GNSS satellites, the position correction data being repeatedly generated by a plurality of reference stations for each GPS satellite; a precision position data acquisition unit configured to acquire precision position data of the terminal attached to the drilling apparatus by applying the position correction data to the received current position information data; a guideline display unit configured to display burden and interval guidelines that are derived on the basis of the precision position data acquired on a screen of the terminal and an input blasting pattern when blasting information, the blasting pattern, and a position where drilling will be performed next are input into a blasting design program of the terminal by a drilling worker who has detached the terminal from the drilling apparatus; and a blast hole position information storage unit configured to store blast hole position information input by the drilling worker through the terminal on the basis of the displayed guidelines.

In addition, the position correction data of the terminal, which is repeatedly generated by the plurality of reference stations for each of the GPS satellites, may be received in the form of a Radio Technical Commission for Maritime Services (RTCM) stream through a Network Transport of RTCM via Internet Protocol (NTRIP).

In addition, the guideline display unit may be configured to receive the blasting information in which a blasting name and a blasting date and time are included by the drilling worker through the terminal, and may be configured to optionally receive blasting pattern information from a pre-stored list of blasting patterns, the blasting pattern information including at least one of a burden, an interval, a drilling diameter, a bench height, a specific charge amount, and an explosive.

In addition, the apparatus may further include a blasting design generation unit configured to generate the blasting design on the basis of the stored blast hole position information.

In addition, the apparatus may further include a work execution instruction unit configured to instruct the drilling worker to re-attach the terminal to the drilling apparatus and then to perform drilling work using the drilling apparatus by providing the blasting design generated on the basis of the stored blast hole position information on the screen of the terminal, the work execution instruction unit being configured to instruct a charging worker to perform charging work by sending the generated blasting design to a terminal of the charging worker when the drilling worker inputs a drilling work completion message through the terminal of the drilling worker.

In addition, the apparatus may further include a detonation image capture unit configured to transmit a charging work completion message received from the terminal of the charging worker to a detonation management server so that detonation work is performed, the detonation image capture unit being configured to capture a detonation image by executing a camera provided on the terminal attached to the drilling apparatus when the detonation work is performed.

In order to achieve the objectives described above, according to the present disclosure, there is provided a method for managing a blasting design on the basis of the Global Navigation Satellite System (GNSS), the method including: receiving, by a position information data receiving unit, current position information data of a terminal attached to a drilling apparatus and position correction data of the terminal by receiving each GNSS position signal from a plurality of GNSS satellites, the position correction data being repeatedly generated by a plurality of reference stations for each GPS satellite; acquiring, by a precision position data acquisition unit, precision position data of the terminal attached to the drilling apparatus by applying the position correction data to the received current position information data; displaying, by a guideline display unit, burden and interval guidelines that are derived on the basis of the precision position data acquired on a screen of the terminal and an input blasting pattern when blasting information, the blasting pattern, and a position where drilling will be performed next are input into a blasting design program of the terminal by a drilling worker who has detached the terminal from the drilling apparatus; and storing, by a blast hole position information storage unit, blast hole position information input by the drilling worker through the terminal on the basis of the displayed guidelines.

In addition, in the displaying of the burden and interval guidelines that are derived on the basis of the precision position data acquired on the screen of the terminal and the input blasting pattern when the blasting information, the blasting pattern, and the position where drilling will be performed next are input into the blasting design program of the terminal by the drilling worker who has detached the terminal from the drilling apparatus, the blasting information in which a blasting name and a blasting date and time are included may be received by the drilling worker through the terminal, and blasting pattern information may be optionally received from a pre-stored list of blasting patterns, the blasting pattern information including at least one of a burden, an interval, a drilling diameter, a bench height, a specific charge amount, and an explosive.

In addition, the method may further include, after the storing of the blast hole position information input by the drilling worker through the terminal on the basis of the displayed guidelines, generating the blasting design on the basis of the stored blast hole position information.

In addition, the method may further include, after the storing of the blast hole position information input by the drilling worker through the terminal on the basis of the displayed guidelines, instructing the drilling worker to re-attach the terminal to the drilling apparatus and then to perform drilling work using the drilling apparatus by providing the blasting design generated on the basis of the stored blast hole position information on the screen of the terminal and then instructing a charging worker to perform charging work by sending the generated blasting design to a terminal of the charging worker when the drilling worker inputs a drilling work completion message through the terminal of the drilling worker.

In addition, the method may further include, after the instructing the drilling worker to re-attach the terminal to the drilling apparatus and then to perform the drilling work using the drilling apparatus by providing the blasting design generated on the basis of the stored blast hole position information on the screen of the terminal and then instructing the charging worker to perform the charging work by sending the generated blasting design to the terminal of the charging worker when the drilling worker inputs the drilling work completion message through the terminal of the drilling worker, transmitting a charging work completion message received from the terminal of the charging worker to a detonation management server so that detonation work is performed and then capturing a detonation image by executing a camera provided on the terminal attached to the drilling apparatus when the detonation work is performed.

In the apparatus and method for managing the blasting design on the basis of the GNSS according to the present disclosure, the precision position data of the terminal attached to the drilling apparatus is acquired by applying current position information data of the terminal attached to the drilling apparatus and position correction data of the terminal by receiving each GNSS position signal from the plurality of GNSS satellites, the position correction data being repeatedly generated by the plurality of reference stations for each of the GPS satellites. Therefore, there is an effect of being capable of identifying the position with an error margin within centimeters.

In addition, in the present disclosure, when the blasting information, the blasting pattern, and the position where drilling will be performed next are input into the blasting design program of the terminal by the drilling worker who has detached the terminal from the drilling apparatus, the burden and interval guidelines that are derived on the basis of the precision position data acquired on the screen of the terminal and the input blasting pattern, the drilling worker determines an appropriate position for a subsequent blast hole on the basis of a positional relationship with the blast holes that have already been recorded, and then the drilling worker instantly generates the blasting design on the blasting site on the basis of the appropriate position of for the subsequent blast hole. Therefore, Systematic work instructions and management are capable of being secured and safety is also capable of being secured, and there is an effect of enhancing work convenience such that the blasting design is capable of being performed even in sites where the blasting design is omitted due to excessive workload.

In addition, in the present disclosure, when the detonation work is performed, the camera provided on the terminal attached to the drilling apparatus is executed so as to capture a detonation image, so that there is an effect that a crushing degree analysis is capable of being performed in real time at the blasting site.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
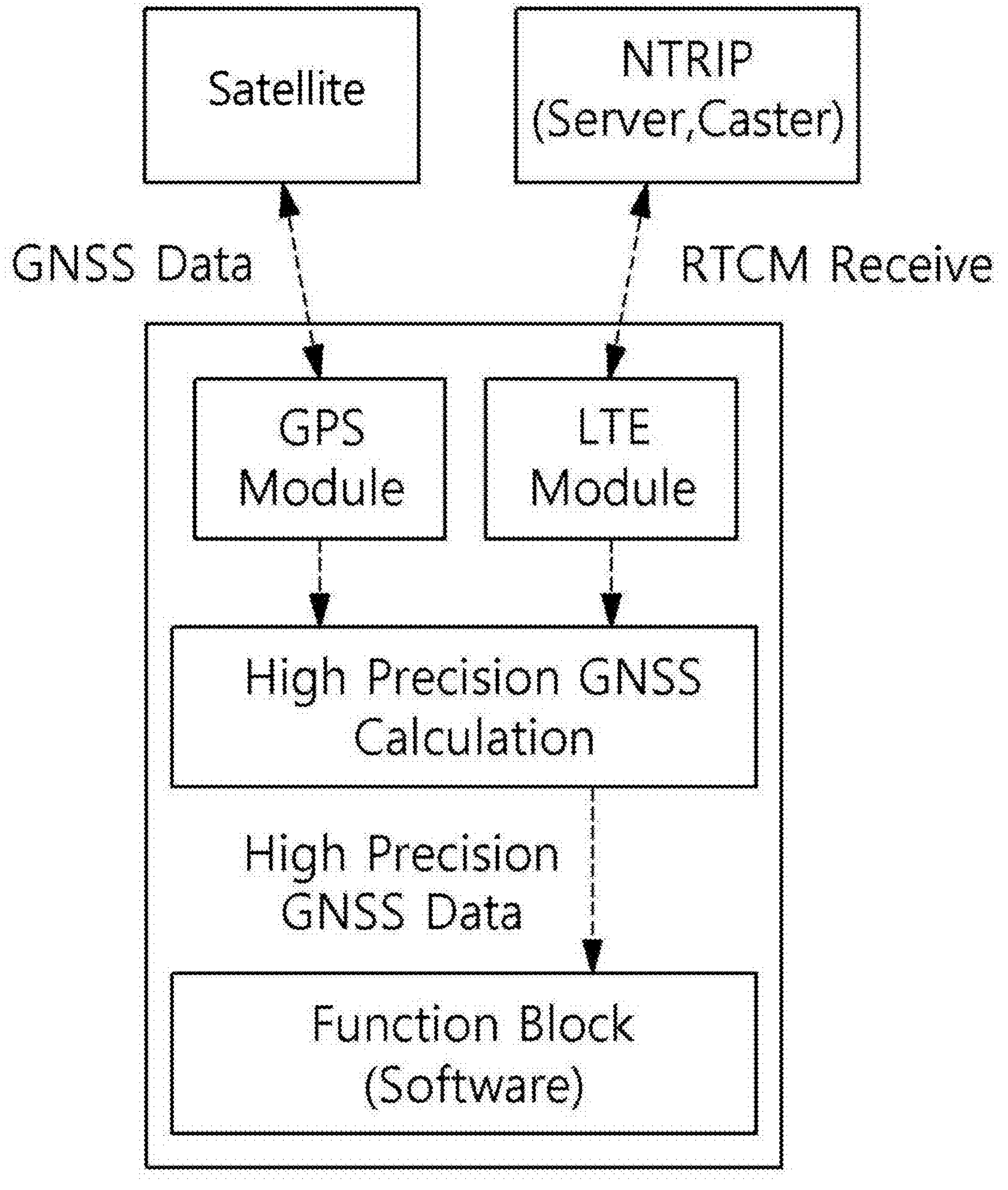
FIG. 1 is a view illustrating a configuration of a communication system applied to an apparatus for managing a blasting design on the basis of the Global Navigation Satellite System (GNSS) according to the present disclosure.

In the present disclosure, various modifications may be made and various exemplary embodiments may be provided, and specific exemplary embodiments will be illustrated in the drawings and described in detail.

However, this is not intended to limit the present disclosure to a particular disclosed form. On the contrary, the present disclosure is to be understood to include all various alternatives, equivalents, and substitutes that may be included within the idea and technical scope of the present disclosure. While describing each drawing, similar reference numerals have been used for similar components.

When a component is described as being "connected", "coupled", or "linked" to another component, that component may be directly connected, coupled, or linked to that other component. However, it should be understood that yet another component between each of the components may be present. In contrast, it should be understood that when a component is referred to as being "directly coupled" or "directly connected" to another component, there are no intervening components present.

The terminology used herein is for the purpose of describing particular exemplary embodiments only and is not intended to be limiting. As used herein, the singular forms are intended to include the plural forms as well, unless the context clearly indicates otherwise. In addition, it will be further understood that the terms "comprise", "include", "have", and so on when used in the present application, specify the presence or absence of stated features, integers, steps, operations, elements, components, and/or combinations of them but do not preclude the possibility of the presence or addition of one or more other features, integers, steps, operations, elements, components, and/or combinations thereof.

Hereinafter, exemplary embodiments of the present disclosure will be described in more detail with reference to the accompanying drawings. Hereinafter, the same reference numerals are used for the same components in the drawings, and duplicate descriptions for the same components are omitted.

FIG. 1 is a view illustrating a configuration of a communication system applied to an apparatus for managing a blasting design on the basis of the Global Navigation Satellite System (GNSS) according to the present disclosure.

Referring to FIG. 1, the communication system applied to the apparatus for managing the blasting design on the basis of the GNSS according to the present disclosure includes a module configured to receive current position information data of a mobile terminal by receiving each GNSS position signal from a plurality of GNSS satellites, and includes a module configured to receive position correction data of the mobile terminal in the form of a Radio Technical Commission for Maritime Services (RTCM) stream through a Network Transport of RTCM via Internet Protocol (NTRIP), the position correction data being repeatedly generated by a plurality of reference stations for each GPS satellite.

At this time, the GNSS is a satellite-based positioning system capable of performing high-precision positioning even in a harsh environment by receiving signals transmitted from all satellites such as GPS (USA), GLONASS (Russia), BDS (China), Galileo (Europe), and so on.

Figure 2:
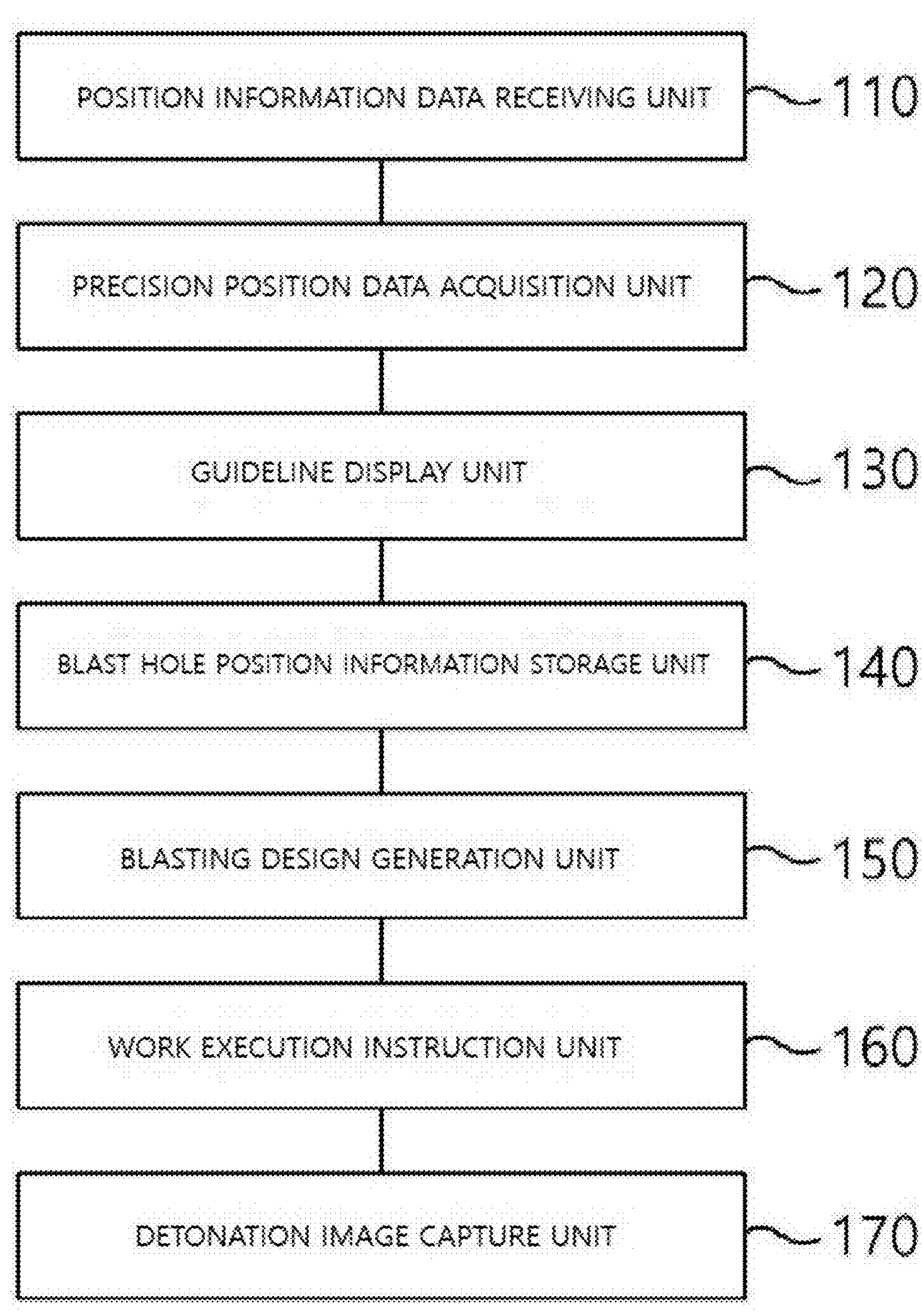
FIG. 2 is a view illustrating a configuration of the apparatus for managing the blasting design on the basis of the GNSS according to the present disclosure.

FIG. 2 is a view illustrating a configuration of the apparatus for managing the blasting design on the basis of the GNSS according to the present disclosure.

Referring to FIG. 2, the apparatus 100 for managing the blasting design on the basis of the GNSS according to the present disclosure includes a position information data receiving unit 110, a precise position data acquisition unit 120, a guideline display unit 130, a blast hole position information storage unit 140, a blasting design generation unit 150, a work execution instruction unit 160, and a detonation image capture unit 170.

The position information data receiving unit 110 is configured to receive current position information data of a terminal attached to a drilling apparatus and position correction data of the terminal by receiving each GNSS position signal from the plurality of GNSS satellites, the position correction data being repeatedly generated by the plurality of reference stations for each of the GPS satellites. At this time, the terminal attached to the drilling apparatus is capable of being detached from and attached to the drilling apparatus by a drilling worker.

The position information data receiving unit 110 is configured to receive the position correction data of the terminal in the form of the RTCM stream through the NTRIP, the position correction data being repeatedly generated by the plurality of reference stations for each of the GPS satellites.

The precision position data acquisition unit 120 is configured to acquire precision position data of the terminal attached to the drilling apparatus by applying the position correction data to the received current position information data.

The guideline display unit 130 is configured to display burden and interval guidelines that are derived on the basis of the precision position data acquired on a screen of the terminal and an input blasting pattern when blasting information, the blasting pattern, and a position where drilling will be performed next are input into a blasting design program of the terminal by the drilling worker who has detached the terminal from the drilling apparatus.

The guideline display unit 130 is configured to receive the blasting information in which a blasting name and a blasting date and time are included by the drilling worker through the terminal, and is configured to optionally receive blasting pattern information from a pre-stored list of blasting patterns, the blasting pattern information including at least one of a burden, an interval, a drilling diameter, a bench height, a specific charge amount, and an explosive.

The blast hole position information storage unit 140 is configured to store blast hole position information input by the drilling worker through the terminal on the basis of the displayed guidelines. That is, the drilling worker is capable of checking a blasting site while the drilling worker is carrying the terminal, and is capable of instantly determining an appropriate position for a subsequent blast hole by using a positional relationship with the blast holes that have already been recorded.

The blasting design generation unit 150 is configured to generate the blasting design on the basis of the stored blast hole position information.

The work execution instruction unit 160 is configured to instruct the drilling worker to re-attach the terminal to the drilling apparatus and then to perform the drilling work using the drilling apparatus by providing the blasting design on the screen of the terminal, the blasting design being generated on the basis of the stored blast hole position information.

In addition, the work execution instruction unit 160 is configured to instruct a charging worker to perform charging work by sending the generated blasting design to a terminal of the charging worker when the drilling worker inputs a drilling work completion message through the terminal of the drilling worker.

The detonation image capture unit 170 is configured to transmit a charging work completion message received from the terminal of the charging worker to a detonation management server so that detonation work is performed, and is configured to capture a detonation image by executing a camera provided on the terminal attached to the drilling apparatus when the detonation work is performed.

As such, the captured image may further include a crushing degree analysis unit configured to analyze a crushing degree. The crushing degree analysis unit is capable of analyzing vibration, noise, and a change in crushing degree that are results of blasting.

Figure 3:
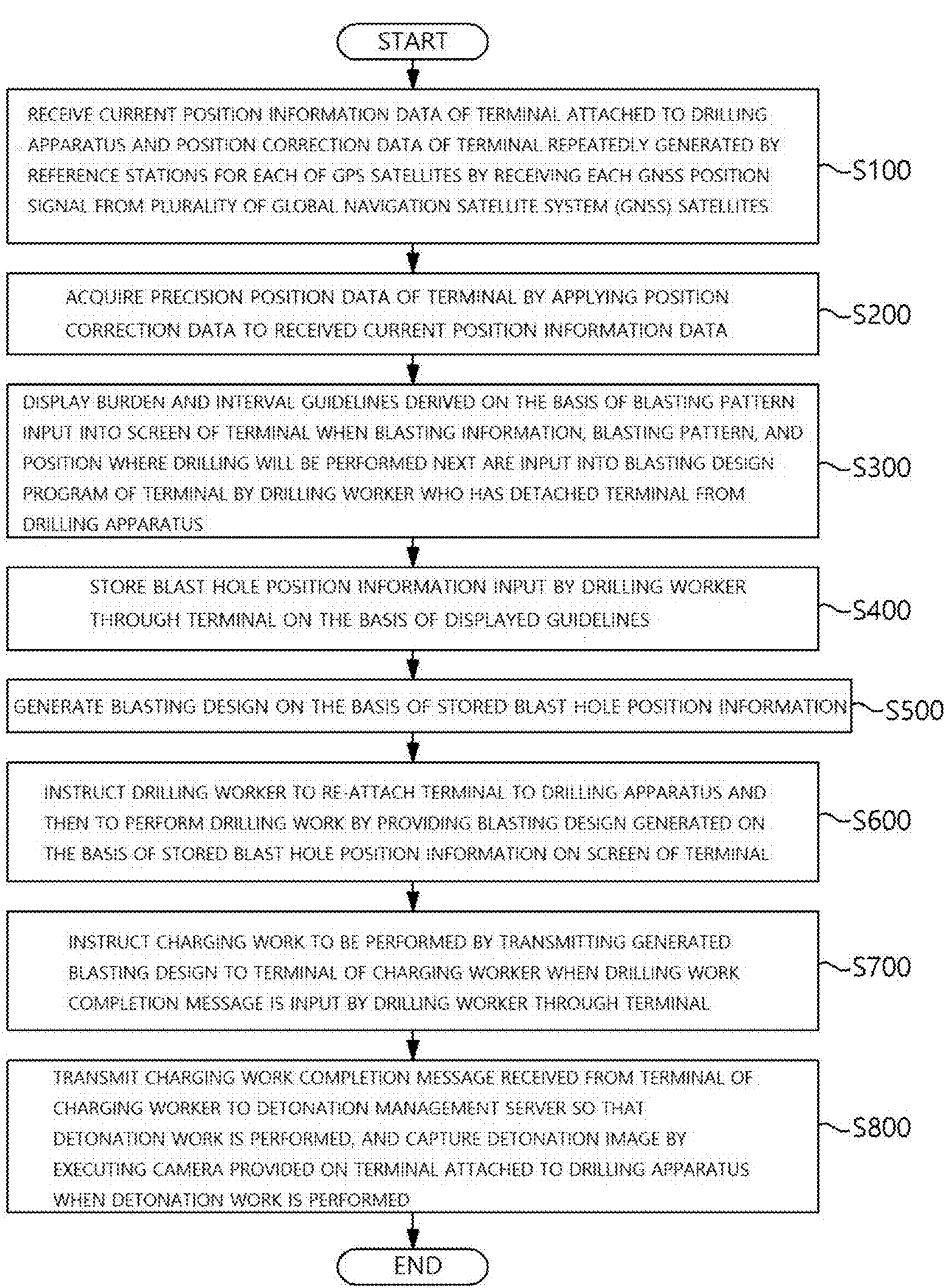
FIG. 3 is a flowchart illustrating a sequence of a method for managing a blasting design on the basis of a GNSS according to the present disclosure.

FIG. 3 is a flowchart illustrating a sequence of a method for managing a blasting design on the basis of a GNSS according to the present disclosure.

Referring to FIG. 3, the method of managing the blasting design on the basis of the GNSS according to the present disclosure uses the apparatus for managing the blasting design on the basis of the GNSS described above, and duplicate descriptions will be omitted.

First, current position information data of a terminal attached to a drilling apparatus and position correction data of the terminal are received by receiving each GNSS position signal from a plurality of GNSS satellites, the position correction data being repeatedly generated by a plurality of reference stations for each GPS satellite (S100).

In the S100 process, the position correction data of the terminal is received in the form of an RTCM stream through an NTRIP, the position correction data being repeatedly generated by the plurality of reference stations for each of the GPS satellites.

Next, precision position data of the terminal attached to the drilling apparatus is acquired by applying the position correction data to the received current position information data (S200).

Next, burden and interval guidelines that are derived on the basis of the precision position data acquired on a screen of the terminal and an input blasting pattern are displayed when blasting information, the blasting pattern, and a position where drilling will be performed next are input into a blasting design program of the terminal by a drilling worker who has detached the terminal from the drilling apparatus (S300).

In the S300 process, the blasting information in which a blasting name and a blasting date and time are included is received by the drilling worker through the terminal, and blasting pattern information is optionally received from a pre-stored list of blasting patterns, the blasting pattern information including at least one of a burden, an interval, a drilling diameter, a bench height, a specific charge amount, and an explosive.

Next, blast hole position information input by the drilling worker through the terminal on the basis of the displayed guidelines is stored (S400).

In the S400 process, the drilling worker is capable of checking a blasting site while the drilling worker is carrying the terminal, and is capable of instantly determining an appropriate position for a subsequent blast hole by using a positional relationship with the blast holes that have already been recorded.

Next, the blasting design is generated on the basis of the stored blast hole position information (S500).

Next, the drilling worker is instructed to re-attach the terminal to the drilling apparatus and then to perform the drilling work using the drilling apparatus by providing the blasting design on the screen of the terminal, the blasting design being generated on the basis of the stored blast hole position information (S600).

Next, a charging worker is instructed to perform charging work by sending the generated blasting design to a terminal of the charging worker when the drilling worker inputs a drilling work completion message through the terminal of the drilling worker (S700).

Next, a charging work completion message received from the terminal of the charging worker is transmitted to a detonation management server so that detonation work is performed, and a detonation image is captured by executing a camera provided on the terminal attached to the drilling apparatus when the detonation work is performed (S800).

As described above, the functional operation and the embodiments related to the present subject matter, which are described in the present specification, may be implemented in a digital electronic circuit or computer software, firmware, hardware, or a combination of one or more thereof, including the structures and structural equivalents thereof, which are disclosed herein.

The embodiments of the subject matter described herein may be implemented as one or more computer program products, i.e., one or more modules related to computer program instructions encoded on a tangible program medium for execution by or for controlling the operation of a data processing device. The tangible program medium may be a radio wave signal or a computer-readable medium. The radio wave signal is a signal generated to encode information to be transmitted to an appropriate receiver device for execution by a computer, that is, for example, an artificially generated signal such as a machine-generated electrical, optical, or electromagnetic signal. The computer-readable medium may be a machine-readable storage device, a machine-readable storage substrate, a memory device, a combination of materials that affect a machine-readable radio wave signal, or a combination of one or more thereof.

The present description presents the best mode of the present disclosure, and provides examples for describing the present disclosure and for enabling those skilled in the art to make and use the present disclosure. The specification written in this way is not intended to limit the present disclosure to the specific terms presented.

Accordingly, although the present disclosure has been described in detail with reference to the above-described examples, those skilled in the art can make modifications, changes, and deformation to the present examples without departing from the scope of the present disclosure. In short, in order to achieve the intended effect of the present disclosure, it is not necessary to separately include all the functional blocks shown in the drawings or follow all the orders shown in the drawings. It should be noted that even though all the functional blocks are separately included or all the orders shown in the drawings are followed as they are shown, the corresponding functional blocks and orders may fall within the technical scope of the present invention described in the claims.

What is claimed is:

1. An apparatus for managing a blasting design on the basis of the Global Navigation Satellite System (GNSS), the apparatus comprising:

a position information data receiving unit configured to receive current position information data of a terminal attached to a drilling apparatus and position correction data of the terminal by receiving each GNSS position signal from a plurality of GNSS satellites, the position correction data being repeatedly generated by a plurality of reference stations for each GPS satellite;

a precision position data acquisition unit configured to acquire precision position data of the terminal attached to the drilling apparatus by applying the position correction data to the received current position information data;

a guideline display unit configured to display burden and interval guidelines that are derived on the basis of the precision position data acquired on a screen of the terminal and an input blasting pattern when blasting information, the blasting pattern, and a position where drilling will be performed next are input into a blasting design program of the terminal by a drilling worker who has detached the terminal from the drilling apparatus; and a blast hole position information storage unit configured to store blast hole position information input by the drilling worker through the terminal on the basis of the displayed guidelines.

2. The apparatus of claim 1, wherein the position correction data of the terminal, which is repeatedly generated by the plurality of reference stations for each of the GPS satellites, is received in the form of a Radio Technical Commission for Maritime Services (RTCM) stream through a Network Transport of RTCM via Internet Protocol (NTRIP).

3. The apparatus of claim 1, wherein the guideline display unit is configured to receive the blasting information in which a blasting name and a blasting date and time are included by the drilling worker through the terminal, and is configured to optionally receive blasting pattern information from a pre-stored list of blasting patterns, the blasting pattern information comprising at least one of a burden, an interval, a drilling diameter, a bench height, a specific charge amount, and an explosive.

4. The apparatus of claim 1, further comprising a blasting design generation unit configured to generate the blasting design on the basis of the stored blast hole position information.

5. The apparatus of claim 1, further comprising a work execution instruction unit configured to instruct the drilling worker to re-attach the terminal to the drilling apparatus and then to perform drilling work using the drilling apparatus by providing the blasting design generated on the basis of the stored blast hole position information on the screen of the terminal, the work execution instruction unit being configured to instruct a charging worker to perform charging work by sending the generated blasting design to a terminal of the charging worker when the drilling worker inputs a drilling work completion message through the terminal of the drilling worker.

6. The apparatus of claim 1, further comprising a detonation image capture unit configured to transmit a charging work completion message received from the terminal of the charging worker to a detonation management server so that detonation work is performed, the detonation image capture unit being configured to capture a detonation image by executing a camera provided on the terminal attached to the drilling apparatus when the detonation work is performed.

7. A method for managing a blasting design on the basis of the Global Navigation Satellite System (GNSS), the method comprising:

receiving, by a position information data receiving unit, current position information data of a terminal attached to a drilling apparatus and position correction data of the terminal by receiving each GNSS position signal from a plurality of GNSS satellites, the position correction data being repeatedly generated by a plurality of reference stations for each GPS satellite;

acquiring, by a precision position data acquisition unit, precision position data of the terminal attached to the drilling apparatus by applying the position correction data to the received current position information data;

displaying, by a guideline display unit, burden and interval guidelines that are derived on the basis of the precision position data acquired on a screen of the terminal and an input blasting pattern when blasting information, the blasting pattern, and a position where drilling will be performed next are input into a blasting design program of the terminal by a drilling worker who has detached the terminal from the drilling apparatus; and storing, by a blast hole position information storage unit, blast hole position information input by the drilling worker through the terminal on the basis of the displayed guidelines.

8. The method of claim 7, wherein, in the displaying of the burden and interval guidelines that are derived on the basis of the precision position data acquired on the screen of the terminal and the input blasting pattern when the blasting information, the blasting pattern, and the position where drilling will be performed next are input into the blasting design program of the terminal by the drilling worker who has detached the terminal from the drilling apparatus, the blasting information in which a blasting name and a blasting date and time are included is received by the drilling worker through the terminal, and blasting pattern information is optionally received from a pre-stored list of blasting patterns, the blasting pattern information comprising at least one of a burden, an interval, a drilling diameter, a bench height, a specific charge amount, and an explosive.

9. The method of claim 7, further comprising:

after the storing of the blast hole position information input by the drilling worker through the terminal on the basis of the displayed guidelines, generating the blasting design on the basis of the stored blast hole position information.

10. The method of claim 7, further comprising:

after the storing of the blast hole position information input by the drilling worker through the terminal on the basis of the displayed guidelines, instructing the drilling worker to re-attach the terminal to the drilling apparatus and then to perform drilling work using the drilling apparatus by providing the blasting design generated on the basis of the stored blast hole position information on the screen of the terminal and then instructing a charging worker to perform charging work by sending the generated blasting design to a terminal of the charging worker when the drilling worker inputs a drilling work completion message through the terminal of the drilling worker.

11. The method of claim 10, further comprising:

after the instructing the drilling worker to re-attach the terminal to the drilling apparatus and then to perform the drilling work using the drilling apparatus by providing the blasting design generated on the basis of the stored blast hole position information on the screen of the terminal and then instructing the charging worker to perform the charging work by sending the generated blasting design to the terminal of the charging worker when the drilling worker inputs the drilling work completion message through the terminal of the drilling worker, transmitting a charging work completion message received from the terminal of the charging worker to a detonation management server so that detonation work is performed and then capturing a detonation image by executing a camera provided on the terminal attached to the drilling apparatus when the detonation work is performed.

* * * * *